United States Patent [19]
Gresham

[11] Patent Number: 5,577,562
[45] Date of Patent: Nov. 26, 1996

[54] HARVESTER FOR ROOT CROPS AND METHOD OF USING SAME

[76] Inventor: Tony R. Gresham, 416 Monticello Pkwy., Portales, N.M. 88130-9273

[21] Appl. No.: 322,607

[22] Filed: Oct. 13, 1994

[51] Int. Cl.$^6$ ............................................. A01D 27/00
[52] U.S. Cl. ............................ 171/27; 171/1; 171/62; 171/57
[58] Field of Search ........................ 171/27, 1, 6, 7, 171/4, 50, 55, 62, 43, 57, 96, 97, 138, DIG. 1; 460/126, 16, 17, 20; 56/328.1

[56] References Cited

U.S. PATENT DOCUMENTS

| | | | |
|---|---|---|---|
| 1,895,157 | 1/1933 | Gailus | 171/1 |
| 2,054,501 | 9/1936 | Grinslade | 55/9 |
| 2,424,148 | 7/1947 | Carelock | 55/51 |
| 2,522,644 | 9/1950 | Searcy | 130/30 |
| 2,539,834 | 1/1951 | Hatton | 56/372 |
| 2,550,332 | 4/1951 | Cross | 171/62 |
| 2,669,820 | 2/1954 | Falkner | 55/139 |
| 2,751,745 | 6/1956 | Magee | 460/126 X |
| 2,771,728 | 11/1956 | Mason | 55/51 |
| 3,106,250 | 10/1963 | Gregory | 171/6 |
| 3,301,331 | 1/1967 | Looker et al. | 171/1 |
| 3,330,363 | 7/1967 | Greedy | 171/1 |
| 3,690,383 | 9/1972 | Malley et al. | 171/1 |
| 3,769,988 | 11/1973 | Burenga | 460/16 X |
| 4,120,363 | 10/1978 | Ernst | 171/58 |
| 4,633,955 | 1/1987 | Gresham | 171/1 |
| 4,687,064 | 8/1987 | Johnson | 171/27 |
| 4,798,248 | 1/1989 | Schwitters | 171/58 X |
| 4,921,050 | 5/1990 | Brown | 171/6 X |
| 5,373,688 | 12/1994 | Stanley et al. | 56/328.1 |

FOREIGN PATENT DOCUMENTS

| | | | |
|---|---|---|---|
| 2279320 | 2/1976 | France | 171/57 |
| 1764556 | 9/1992 | U.S.S.R. | |

*Primary Examiner*—Terry Lee Melius
*Assistant Examiner*—Victor Batson
*Attorney, Agent, or Firm*—Wendell Coffee

[57] ABSTRACT

The stems and limbs of a root crop plant are lifted from the ground, folded over a gathering bar, and grasped by an auger-paddle. The roots below the crop are severed by a cutter bar which resembles a rod weeder. While the crop is held the soil beneath the crop is pulled from the be in which the crop grows into a furrow on either side of the bed. As much as possible the root crop is cleaned as it is lifted up by the rotation of the paddle-auger while the limbs and stems of the plant are caught within the paddle-auger and held by the helicoil. After they are lifted free of the soil they are moved from two beds toward a furrow between those two beds and discharged in a windrow by a roller which rotates the opposite direction of the paddle-augers.

11 Claims, 3 Drawing Sheets

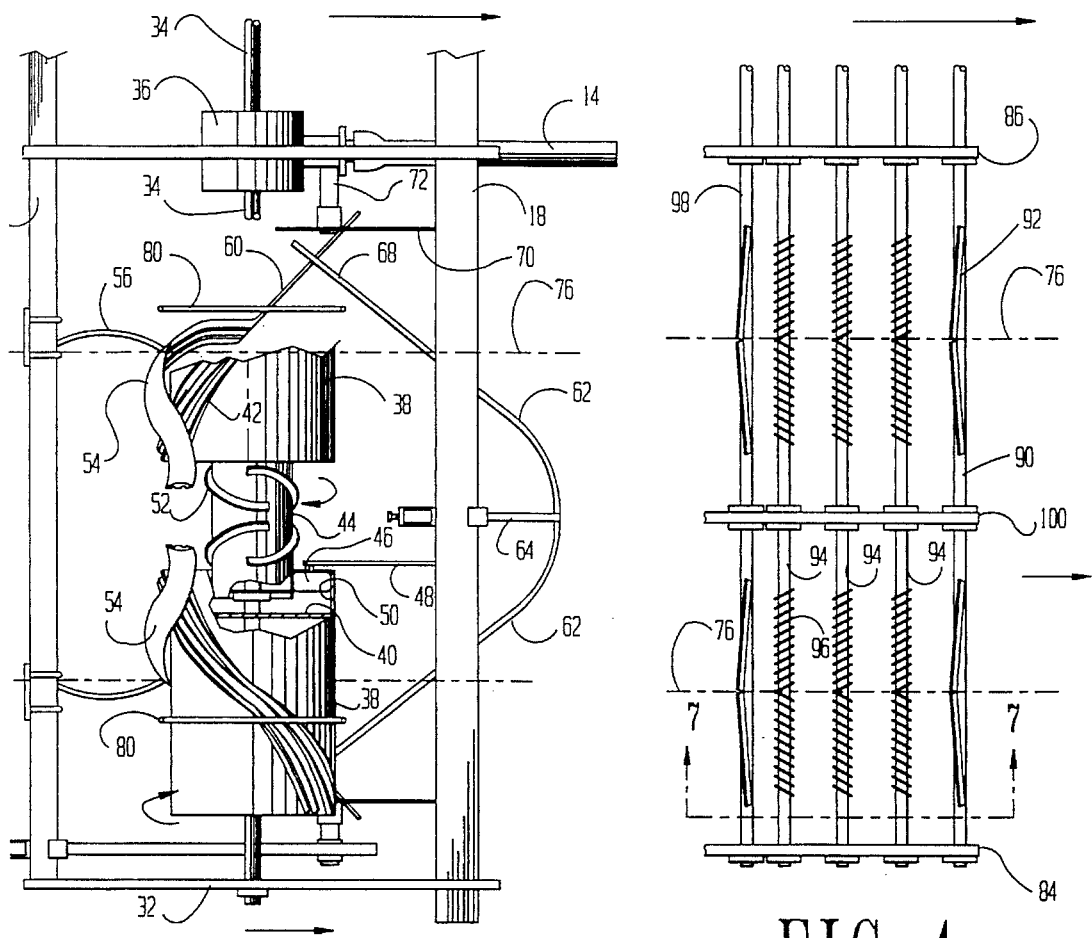
FIG-2
FIG-4
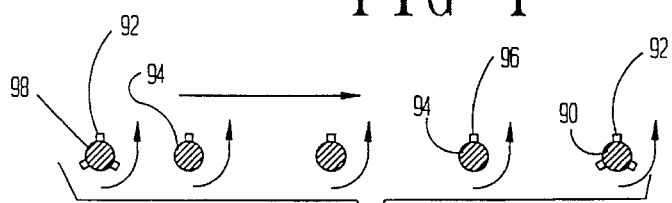
FIG-7

2

HARVESTER FOR ROOT CROPS AND METHOD OF USING SAME

BACKGROUND OF THE INVENTION (1) Field of the Invention

This invention relates to harvesting machines, and more particularly to harvesting root crops such as peanuts. Farmers who grow peanuts have ordinary skill in this art.

(2) Description of the Related Art

Harvesting peanuts is particularly difficult. My previous U.S. Pat. No. 4,633,955 discloses a harvester which uses augers which are angled but otherwise somewhat aligned with the row or drill of which the root crop is planted. The root crop in that case was pulled within the slot of guides. That patent discloses at least a single rod weeder 72 which is described as a facilitator of removing the peanuts from the bed. (see Col. 6, Line 40).

SUMMARY OF THE INVENTION (1) Progressive Contribution to the Art

This application discloses improvements and changes from the harvester shown in my previous patent. Specifically, the guide pair in the previous patent is replaced by a single helicoil. It has been found that one edge of the helicoil will sufficiently guide the limbs and stems of the peanut plant to a discharge point. This is particularly true in as much as the helical augers referred to herein as paddle-augers are mounted at right angles to the direction of travel and to the direction of the drill wherein the peanuts are grown. Also, a series of fingers have been mounted upon the paddle-augers to aid in separating the stems and limbs of the plant. Furthermore, a gatherer and folder arm have been added as well as a dart. If the peanuts are the vine type peanuts that grow close to the ground, the dart, folder, and gatherer will lift the peanuts from the ground, fold them over, and guide them onto the single helicoil. The helicoil holds the peanuts in proper position within the paddle-auger and guides them from the paddle-auger to a discharge roller which discharges them in better condition than in the prior patent.

A series of conveyor cleaner augers have been mounted similar to a rod weeder immediately behind a first rod. The first rod cuts the roots of the plant below the crop. The cleaner-conveyors remove much of the dirt from under the crop. Following the series of cleaner-conveyors, a fluffer agitates the soil and helps to remove the soil from the peanuts or other root crop.

The terms ground, dirt, and soil are used interchangeably in this specification.

The useful product is referred to as the crop, which in this case is the peanuts within the shell. The plant above the ground will sometime be referred to as a vine, although often it is more of a bush type plant rather than a vine on the ground. In any event, the plant above the ground will have stems and limbs.

(2) Objects of this Invention

An object of this invention is to harvest root crops.

Another object of this invention is to specifically harvest peanuts and to clean as much soil as possible from the peanuts.

Further objects are to achieve the above with devices that are sturdy, compact, durable, lightweight, simple, safe, efficient, versatile, ecologically compatible, energy conserving, and reliable; yet inexpensive and easy to manufacture, operate, and maintain.

Other objects are to achieve the above with a method that is rapid, versatile, ecologically compatible, energy conserving, efficient, and inexpensive, and does not require highly skilled people to operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 2 is a top plan view of half of the harvester with parts broken away for clarity.

FIG. 4 is a top plan view of the underground apparatus taken substantially on Line 4—4 of FIG. 3.

FIG. 7 is a sectional view of the rod weeders showing their construction and rotation.

Figure 1:
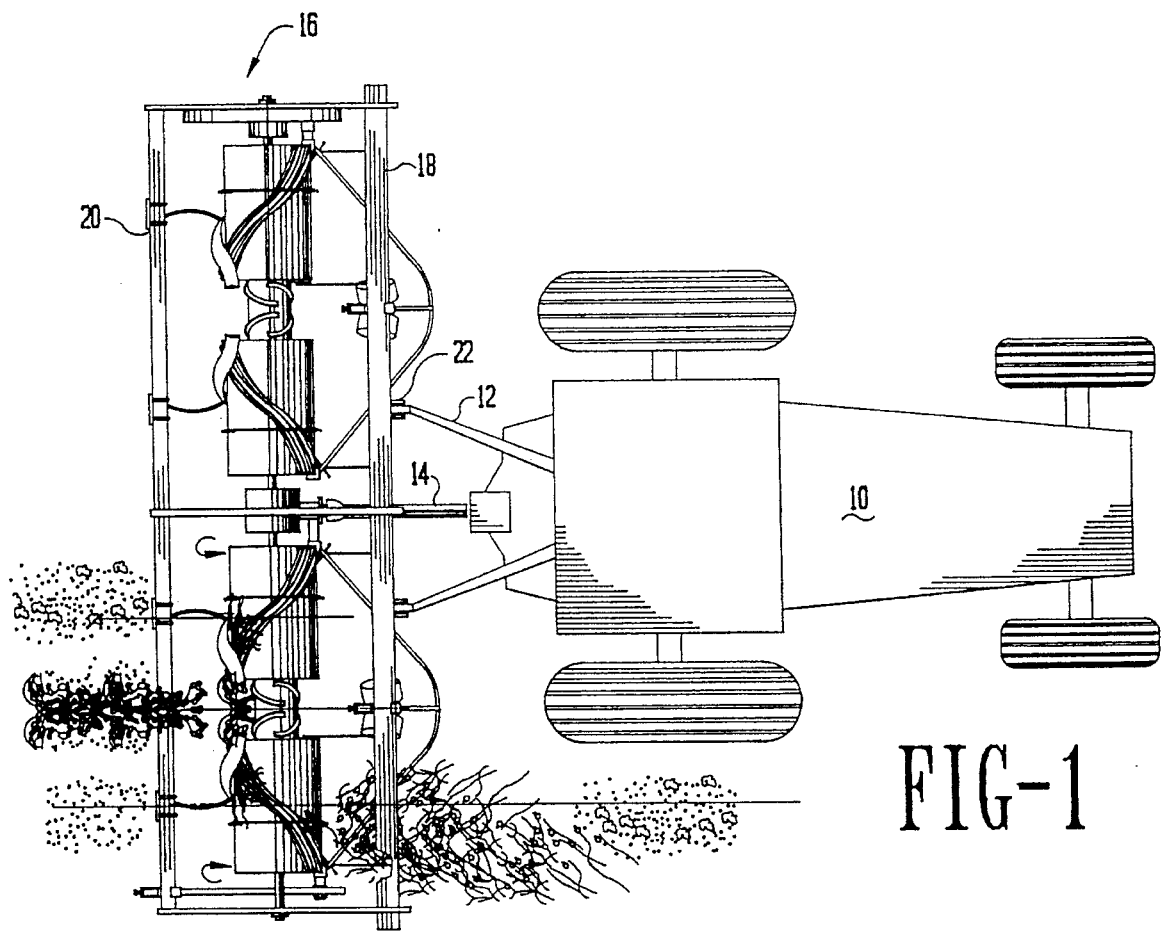
FIG. 1 is a top plan view of a harvester, according to this invention, attached to a farm tractor.

As an aid to correlating the terms of the claims to the exemplary drawing(s), the following catalog of elements and steps is provided:

10. farm tractor
12. hitch
14. PTO shaft
16. harvester
18. forward draw bar
20. rear bar
22. attachment points
24. forward wheel
26. strut
28. rear wheel
30. strut
32. braces
34. main shaft
36. gear box
38. paddle-auger drum
40. head
42. auger flight
44. vine discharge roller
46. planetary roller
48. arm
50. inside shell
52. vine guides
54. helicoil
56. coil strut
58. forward tip
60. vine gatherer
62. vine folder bow
64. leg
66. forward portion 68. tips
70. dart
72. shank
74. forward point
76. drill
78. bed
80. rod
82. finger
84. outside arm
86. inside arm
88. hanger
90. cutter rod
92. cutter bar
94. mover and conveyor shaft
96. auger flights
98. fluffer and cleaner bar
100. floating arm

DESCRIPTION OF THE PREFERRED EMBODIMENT

Referring to the drawings, and more particularly to FIG. 1, it may be seen that the peanut harvester primarily operates upon a vehicle intended to be drawn behind farm tractor 10. The farm tractor will have customary hitch 12 by which the harvester is attached. Also, it will have power takeoff shaft (hereafter PTO shaft) 14.

The harvester 16 has forward draw bar 18 and rear bar 20. The forward draw bar includes attachment points 22 by which the hitch 12 is attached to the drawbar.

Forward wheels 24 are attached to the drawbar 18 by strut 26. Rear wheels 28 are attached to the rear bar 20 by struts 30. The wheels 24 and 28 support the harvester 16. The forward and rear bars are connected by suitable braces 32.

Horizontal main shaft 34 is journalled for rotation by suitable bearings and attached to the braces 32. Right angle gear box 36 is attached to the PTO shaft 14 and drives the main shaft.

Two paddle-auger drums 38 are attached to the shaft 34 by suitable heads 40 within the drums 38. The heads 40 are fixed to the shaft 34, and cylindrical shell 50 of the drum 38 is welded to the heads.

Figure 3:
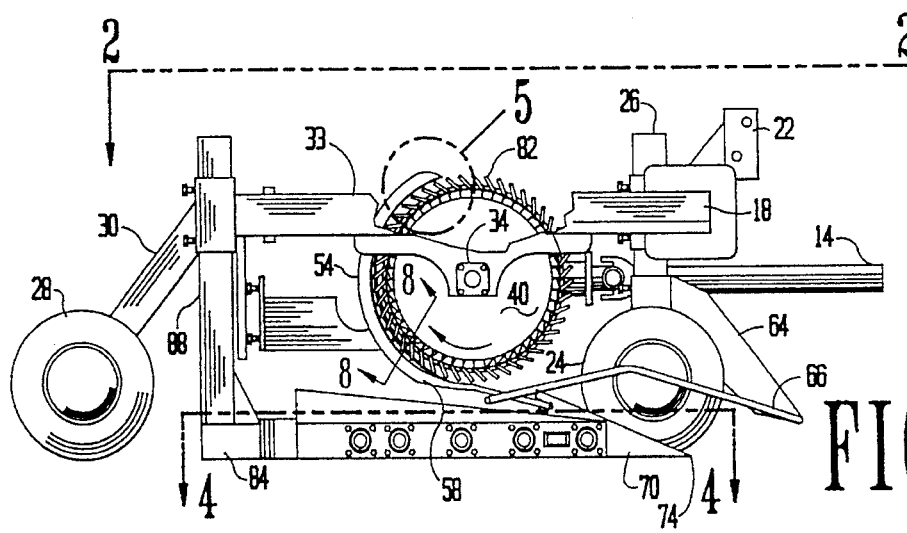
FIG. 3 is a side elevational view of the harvester.
Figure 8:
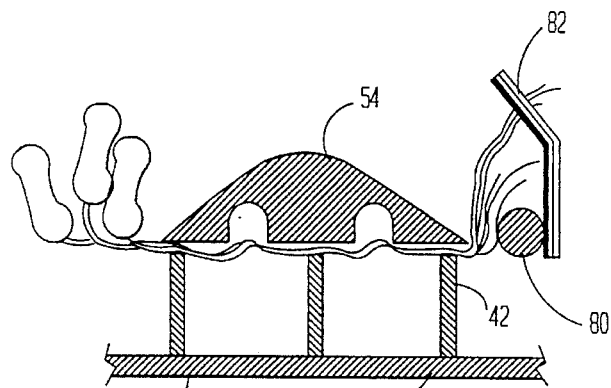
FIG. 8 is a cross-sectional view taken across the helicoil and showing the auger flights on the paddle auger drum.

Auger flights 42 are attached to the drum 38. The auger flights are on a 45 degree angle to a circumferential line upon the drums, and therefore they are also at a 45 degree angle to an axial line, or a line parallel to the axis. The flights 42 are positioned approximately one inch apart and extend outward from the surface of the drum about one inch. For clarity of the drawings only an exemplary number of flights have been shown in FIG. 2, however, FIG. 3 shows the flights as they would extend all the way around.

The gear box 36 is designed so that the forward portion of the drum 38 moves downward and the rearward portion moves upward. The speed of the drum is preferably Set so that the surface speed of the drum is slightly faster (e.g. 10 percent) than the movement of the harvester 16 over the ground.

Shaft 34 and the axis of the drum 38 are normal, which is to say 90 degrees to the direction of travel of the harvester 16.

Vine discharge roller 44 is journalled to the shaft 34 between an adjacent pair of paddle-auger drums 38. Each pair working together, one pair is to one side of the gear box 36 and the other pair to the other side of the gear box.

The rollers are journalled by conventional bearings to the shaft 34. The rollers are driven by planetary roller 46 which is journalled to arm 48 which extends rearwardly from the drawbar 18. The planetary roller contacts inside shell 50 of the auger drum 38 and the outside surface of the roller 44. Therefore, the roller rotates in a direction opposite from the rotation direction of the paddle-auger drum. The surface speed of the roller is about the same as the surface speed of the auger drum.

The roller 44 has vine guides 52 on its cylindrical surface to bunch the vines together. Vines thrown on the roller are thrown to the rear and discharged. The guides will tend to pull the vines toward the middle as they are discharged.

Figure 5:
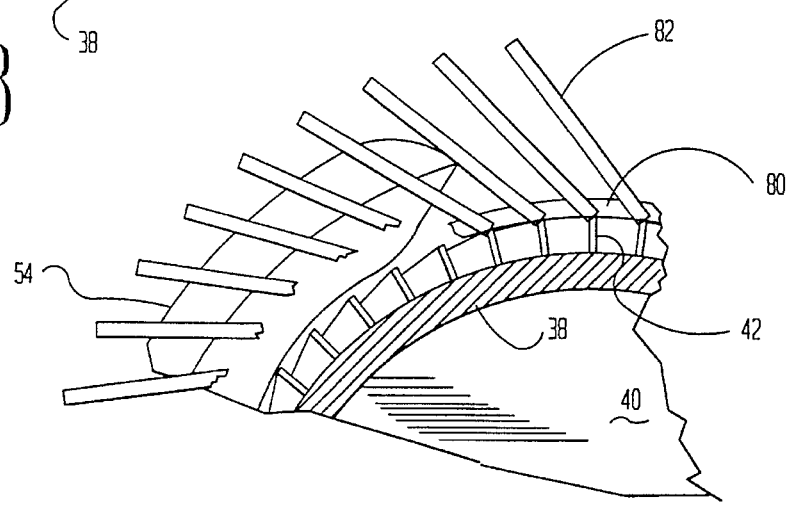
FIG. 5 is a detail of a portion of the surface of the paddle-auger showing details of construction and also the lifting fingers and terminal portion of the helicoil, which is taken substantially from the circle five of FIG. 3.
Figure 6:
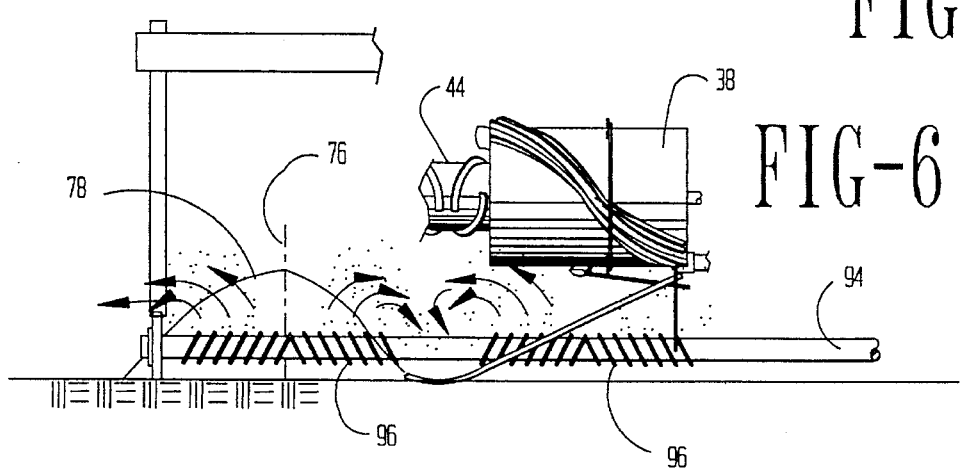
FIG. 6 is a front elevational view somewhat schematic, which shows the operation of the cleaning conveyors and half which shows the folding of the plants to engage with the paddle-auger.

Helicoil 54 is attached to the rear bar 20 by coil strut 56. The major portion of the helicoil 54 will have a circular configuration as seen in FIG. 3. The major portion of the helicoil will run as close as possible to the outside edges of the flights 42 on the auger drum 38. This relationship is shown in FIG. 3 and FIG. 5.

The forward tip 58 of the helicoil 54 runs along a circumferential line. This circumferential line extends from substantially the level of the shaft 34 or slightly below it on around to immediately below the shaft. The point where the forward portion of the helicoil is on a circumferential line is also about the point where the coil struts 56 attach to the helicoil. Above this point of attachment, the helicoil angles toward the roller 44 to the upper portion of the helicoil which is on approximately an axial line. As seen in FIG. 5, this will be near the top but slightly behind top dead center of the drum 38.

Vine gatherer 60 is attached by welding to the forward most point of the forward tip 58 of the helicoil 54. It angles away from the roller 44 at about a 45 degree angle to the direction of travel, which would also be about a 45 degree angle to the vertical plane in which shaft 34 lies.

Vine folder bow 62 is attached by leg 64 to the drawbar 18. As seen in FIG. 3, forward portion 66 of the bow is slightly above ground level. Tips 68 of the bow overlap the vine gatherer 60 and are on top of the vine gatherer.

Dart 70 is attached by shank 72 to braces 32. The dart is triangular shaped and forward point 74 of the dart will run at or below ground level. The outward tip of the vine gatherer 60 will be in a notch at the top and the rear of the dart 70.

In operation, the stems and limbs of the peanut plant to be harvested will be lifted by the dart 70 so that they will be gathered toward drill 76. The drill will normally be where the stems of the peanut plant emerge from bed 78. The branches of the plant or the vine are gathered by the vine gatherer 60 toward this drill line or where the stems emerge. The tips 68 of the bow 62 will fold the vine or bush of the plant over the gatherer 60. As the harvester 16 advances, the auger drum 38 moves over the plants, stems, vines and limbs of the peanut plant, and these will fall between the flights 42 of the auger.

This section of the harvester is where the limbs and stems are gathered and folded.

Circumferential rod 80 encircles the flights of the paddle auger 38 as seen in FIGS. 3 and 5. This band is located on the paddle auger so it runs just to the outside of the drill 76. By outside is meant the side opposite from the vine discharge roller 44. An appropriate notch is made within the section between the vine gatherer 60 and the helicoil 54 at this point. As seen in the drawings, this band 80 will be about the connection point between the gatherer and the helicoil 54. Fingers 82 attached to the rod 80 extend outward therefrom at a 45 degree angle from a tangent of the cylinder at the point of attachment. The fingers will divide the stems and limbs of the peanut plant and help guide them between the flights 42 of the paddle auger.

The fingers 82 are angled as indicated so that when the vines are discharged from the paddle auger at the discharge roller 44, the vines will readily disengage from the fingers.

The section of helicoil which is circumferential is the section where the root crop is lifted upward from the soil.

From the above it may be seen how the row crop plant and its stem, along with its limbs and branches, whether it be a vine or bush, are pulled up from the soil and discharged in an upside down position in a windrow.

The section where the helicoil 54 angles to an axial line portion is the section where the root crop is moved to a windrow.

It has also been determined that it is advantageous to cut any roots which extend below the crop in the soil. Furthermore, this procedure causes the soil to be removed from below the crop so that the crop is at least partially cleaned as it is being lifted from the soil. Referring to FIGS. 3 and 4, there may be seen a series of shafts which resemble rod weeders as seen in FIGS. 3, 4, 6, and 7. There are three fixed rod weeder support arms comprising two outside arms 84 and inside arm 86. Each of these arms are connected to hanger 88 which extends downwardly from the rear bar 20. The two arms 84 are on the outside edges and the inside arm 86 is immediately below the PTO shaft 14 and the gearbox 36. The first rod which is called cutter rod 90 extends from one outside arm to the other and is mounted in the arms. At least one of the arms will have a series of sprockets and drive so that each of the arms are driven in the direction as indicated in FIGS. 4 and 7.

The first cutter rod 90 will preferably have three bars 92, to aid in the separation of the roots and the severing of the roots of the plant which may extend below the crop. To prevent vibration, the bars 92 are mounted so that they have a slight twist around the shaft. This prevents the bar from engaging in a single bump.

The next series of bars 94 will each have helical flight 96 attached thereto. The bars 94 will be the mover and conveyor bars. The auger flights are mounted upon the shafts 94 so that they move the dirt outward from the drill 76. They are built to auger the soil outward from the drill into the furrow between the beds 78.

The last bar as the harvester progresses along the field will be the fluffer and cleaner bar 98. Bar 98 will have a similar or identical construction to the cutter bar 90. The function of the cleaner and fluffer bar is to agitate the soil which might be remaining at this point so that the soil is removed or freed from the crop. If the crop is peanuts, the fluffer and cleaner bar will aid in the pulverizing of the soil so that the soil will fall by gravity from the peanuts at the point that the peanuts are being raised from the bed by the action of the paddle auger 38.

In construction, one inch diameter shafts are used for each of the bars 90, 94, and 98. The flights or bars 92 and 96 thereon are made from ¼ inch square T-stock.

Those with ordinary skill in the art will understand how to mount sprockets, idlers and drive from the gearbox to either the center arm or inside arm 86 to drive the bars 90, 94, and 98 in the direction as indicated. All of the bars will move at the same rotational speed for their intended purpose. It will be noted that the flights 96 upon the mover and conveyor shafts are right and left handed so that they move the dirt from the drill to the furrow between beds. To prevent the cutter shaft from bending as it goes through the earth, floating arm 100 is attached between the fixed arms 84 and 86. The floating arm 100 will not be attached to any structure except the five bars however, by connecting all of the five bars together if any of the bars hits an obstruction the force of that obstruction is transferred to all five bars, thereby preventing the lead bar 90 from being bent.

The stems and limbs are scored or cut or damaged by movement between the helicoil and the paddle-auger flights. This is advantageous because the damage to the limbs and stems cause the crop in the windrow to loose moisture quicker. Therefore, the windrow can be picked up sooner.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific example above do not point out what an infringement of this patent would be, but are to enable one skilled in the art to make and use the invention. The limits of the invention and the bounds of the patent protection are measured by and defined in the following claims.

I claim as my invention:

1. The method of harvesting a root crop having a crop portion beneath the surface of the earth and a plant in a drill with a stem and limbs extending above the earth, comprising the following steps:

a) grasping the stem, then b) moving soil from under the crop away from the drill, then c) lifting the crop upward by pulling the stem upward, d) wherein said crop is grown upon the bed and further comprising: placing the removed soil into furrows adjacent to the bed.

2. The method of harvesting a root crop having a crop portion beneath the surface of the earth and a plant in a drill with a stem and limbs extending above the earth, comprising the following steps:

a) grasping the stem, then b) moving soil from under the crop away from the drill, then c) lifting the crop upward by pulling the stem upward, d) agitating the soil beneath the crop after moving the soil and before lifting the crop and e) agitating the soil by rotating a rod having longitudinal flights thereon beneath the crop.

3. The method of harvesting a root crop having a crop portion beneath the surface of the earth and a plant in a drill with a stem and limbs extending above the earth, comprising the following steps:

a) grasping the stem, then b) moving soil from under the crop away from the drill, then c) lifting the crop upward by pulling the stem upward and d) grasping the stem by positioning the stem between flights of a paddle-auger drum, and holding the stems within the flights by a helicoil, e) wherein said root crop plant is peanuts and the stem and limbs are in the form of a vine and further comprising:

f) positioning the vine between the flights of the paddle-auger drum by g) lifting the stems and limbs of the vines upward by fingers which encircle the paddle-auger drum.

4. The method as defined in claim 3 further comprising:

h) positioning the vine to be placed between the flights of the paddle-auger drum by folding the vines over a portion of the helicoil which engages the vine before the vine is placed between said flights.

5. The method as defined in claim 4 further comprising:

i) lifting the vines by a dart which engages the vine before and in front of the helicoil.

6. A harvester for harvesting a root crop having:

a) a forward drawbar and a rear bar connected by braces, b) attachment points on the drawbar for attaching the drawbar to a farm tractor, c) a gearbox attached to the drawbar which is adapted to be connected to a PTO shaft from the farm tractor, wherein the improvement comprises in combination with the above:

d) a horizontal shaft journalled to the braces, dd) said horizontal shaft at right angles to the direction of travel, e) a paddle-auger drum on the horizontal shaft, f) said gearbox forming means for rotating the horizontal shafts whereby a forward portion of the paddle-auger drum moves down and a rear portion moves up, and the surface speed of the paddle-auger drum is slightly greater than the ground speed of the harvester over the surface of the ground, g) auger flights on the paddle-auger drum, h) a helicoil spaced slightly away from the auger flights attached to the rear bar, i) said helicoil having a circumferential portion, j) the helicoil having an angle portion which angles toward an edge of the paddle-auger drum and k) the helicoil having a terminal part which extends from an edge of the paddle-auger drum to the angle portion of the helicoil, l) a gatherer at a forward tip of the helicoil extending at an angle outward from the helicoil.

7. The harvester as defined in claim 6 further comprising:

m) a vine folder bow attached to the forward drawbar, n) said bow extending rearwardly at an angle and crossing the gatherer above the gatherer, and o) a dart attached to one of said braces, said dart located below the gatherer so that vines may be lifted by the dart, gathered by the gatherer and folded over the gatherer by the bow.

8. A harvester for harvesting a root crop having:

a) a forward drawbar and a rear bar connected by braces, b) attachment points on the drawbar for attaching the drawbar to the farm tractor, c) a gearbox attached to the drawbar which is adapted to be connected to PTO shaft from the farm tractor, wherein the improvement comprises in combination with the above:

d) a horizontal shaft journalled to the braces, dd) said horizontal shaft at right angles to the direction of travel, e) a paddle-auger drum on the horizontal shaft, f) said gearbox forming means for rotating the horizontal shafts whereby a forward portion of the paddle-auger drum moves down and a rear portion moves up, and the surface speed of the paddle-auger drum is slightly greater than the ground speed of the harvester over the surface of the ground, g) auger flights on the paddle-auger drum, h) a helicoil spaced slightly away from the auger flights attached to the rear bar, i) said helicoil having a circumferential portion, j) the helicoil having an angle portion which angles toward an edge of the paddle-auger drum and k) the helicoil having a terminal part which extends from an edge of the paddle-auger drum to the angle portion of the helicoil, l) a circumferential rod circling the flights, m) said rod having fingers extending outward therefrom at about a 45 degree angle.

9. A harvester for harvesting a root crop having:

a) a forward drawbar and a rear bar connected by braces, b) attachment points on the drawbar or attaching the drawbar to the farm tractor, c) a gearbox attached to the drawbar which is adapted to be connected to a PTO shaft from the farm tractor, wherein the improvement comprises in combination with the above:

d) a horizontal shaft journalled to the braces, dd) said horizontal shaft at right angles to the direction of travel, e) a paddle-auger drum on the horizontal shaft, f) said gearbox forming means for rotating the horizontal shafts whereby a forward portion of the paddle-auger drum moves down and a rear portion moves up, and the surface speed of the paddle-auger drum is slightly greater than the ground speed of the harvester over the surface of the ground, g) auger flights on the paddle-auger drum, h) a helicoil spaced slightly away from the auger flights attached to the rear bar, i) said helicoil having a circumferential portion, j) the helicoil having an angle portion which angles toward an edge of the paddle-auger drum and k) the helicoil having a terminal part which extends from an edge of the paddle-auger drum to the angle portion of the helicoil, l) an outside arm on each end of the harvester attached to the rear bar, m) a plurality of rods extending from one arm to the other, n) said rods journalled in said arms, o) a means connected to said gear box for rotating said rods so that a forward face of each rod moves upward, p) a forward rod of said rods being a cutter rod, q) a rear rod of said rods being a fluffer rod, r) at least two conveyor-cleaner rods between the forward rod and the rear rod, and s) said conveyor-cleaner rods having an auger flight around them, so arranged and constructed to auger dirt.

10. The invention as defined in claim 9 further comprising:

t) an inside arm parallel to the two outside arms, u) said inside arm connected to the rear bar, v) two floating arms parallel to the inside arm, w) one of said floating arm between the inside arm and one of the outside arms, the other floating arm between the inside arm and the other outside arm, x) said floating arms having said rods journalled thereto and said floating arms unconnected to any structure except the rods.

11. The invention as defined in claim 10 further comprising:

y) a gatherer at a forward tip of the helicoil extending at an angle outward from the helicoil, z) a vine folder bow attached to the forward drawbar, aa) said bow extending rearwardly at an angle and crossing the gatherer above the gatherer, bb) a dart attached to one of said braces, said dart below the gatherer so that the vines may be lifted by the dart, gathered by the gatherer and folded over the gatherer by the bow, and cc) a circumferential rod circling the flights, dd) said circumferential rod having fingers extending outward therefrom at about a 45 degree angle.

* * * * *